Figure 1:
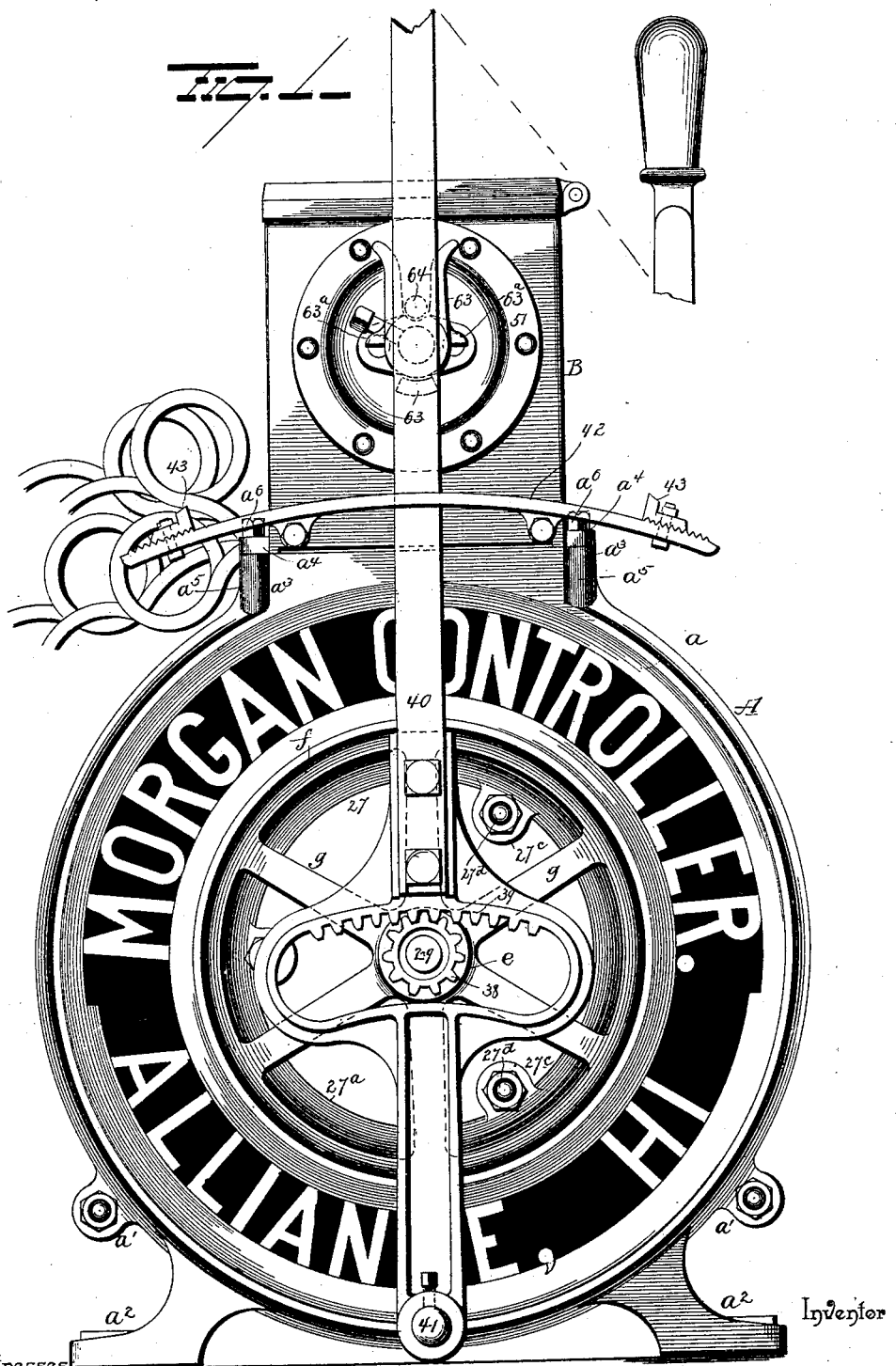

(No Model.)  9 Sheets—Sheet 4.
W. H. MORGAN.
ELECTRIC CONTROLLER.

No. 549,608. Patented Nov. 12, 1895.

Witnesses
E. P. Nottingham
G. F. Downing

Inventor
W. H. Morgan
By H. A. Seymour
Attorney

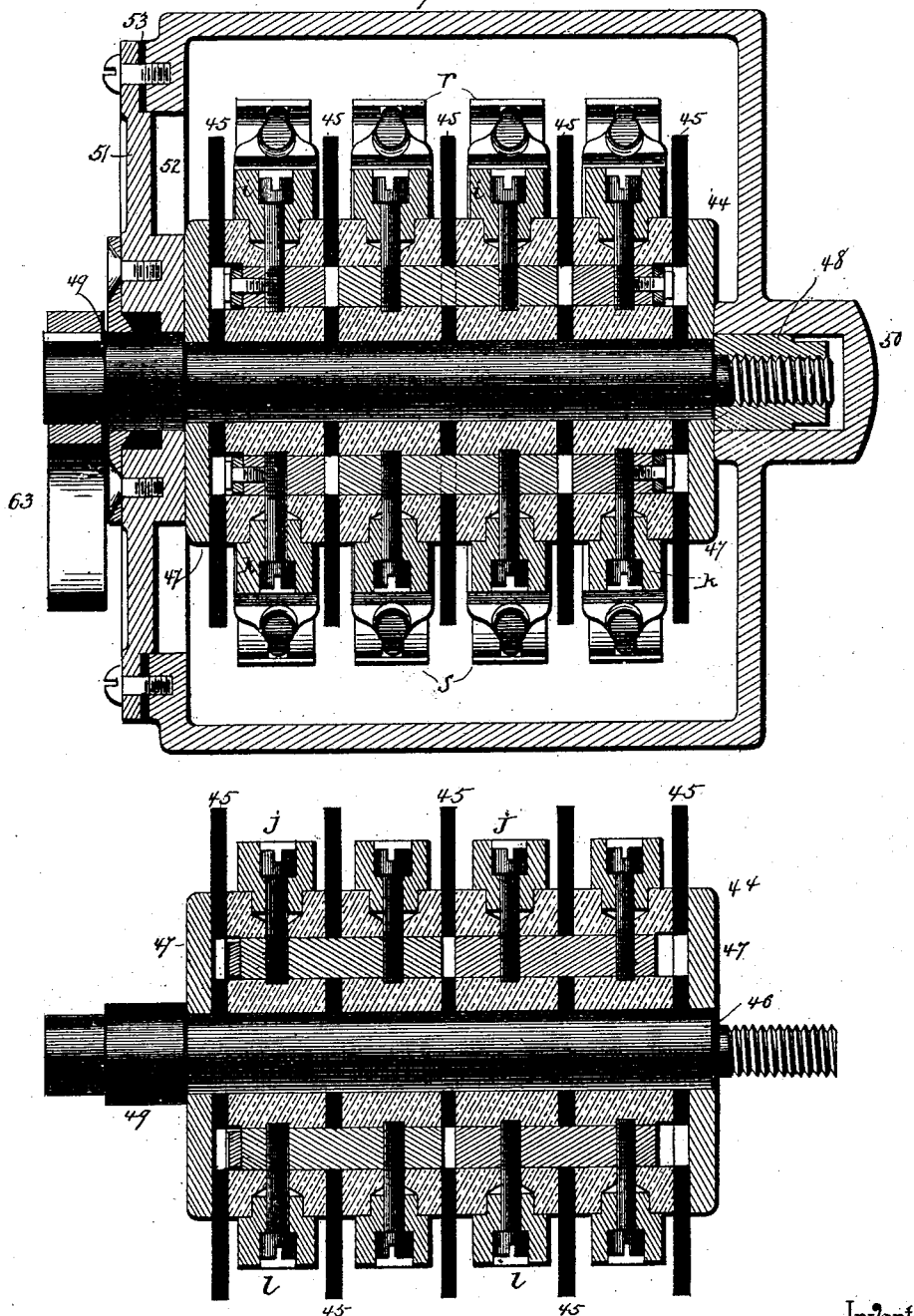

(No Model.) 9 Sheets—Sheet 6.
W. H. MORGAN.
ELECTRIC CONTROLLER.
No. 549,608. Patented Nov. 12, 1895.
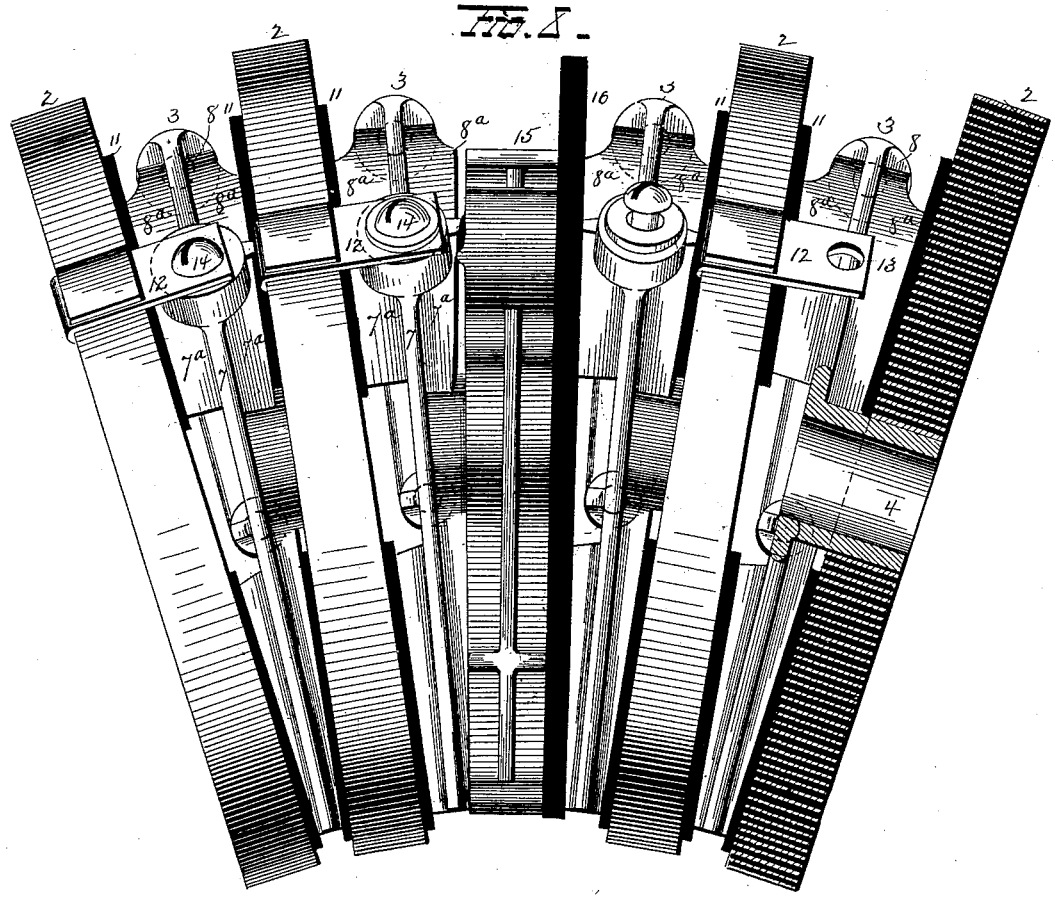
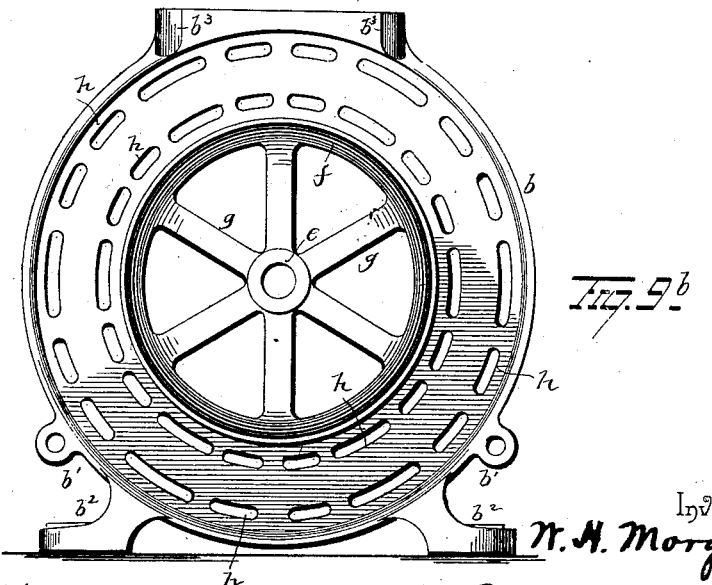

(No Model.)　　　　　　　　W. H. MORGAN.　　　　9 Sheets—Sheet 7.
ELECTRIC CONTROLLER.
No. 549,608.　　　　　　　　　　　Patented Nov. 12, 1895.
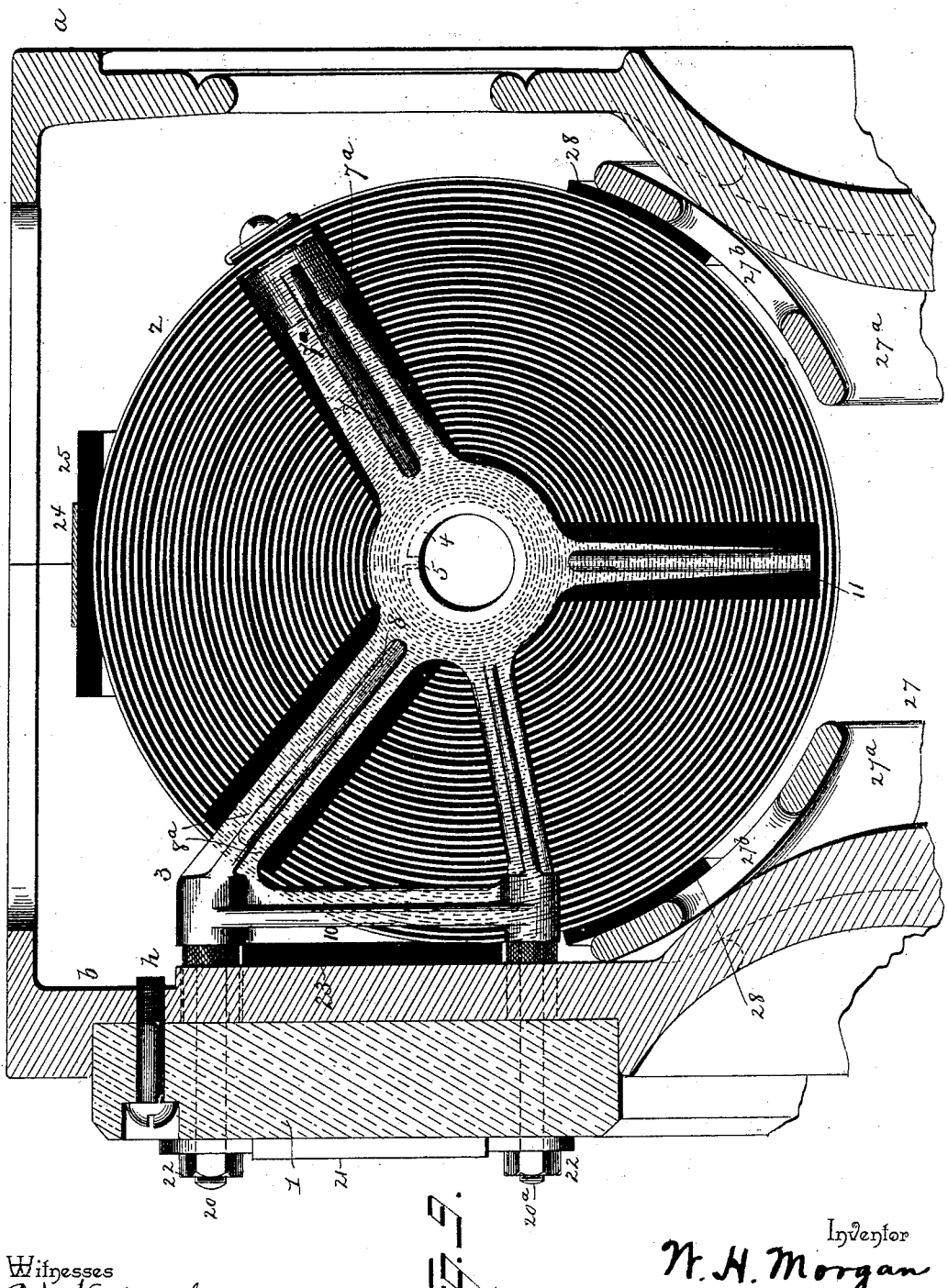
Witnesses
E. J. Nottingham
G. F. Downing
Inventor
W. H. Morgan
By H. A. Seymour
Attorney

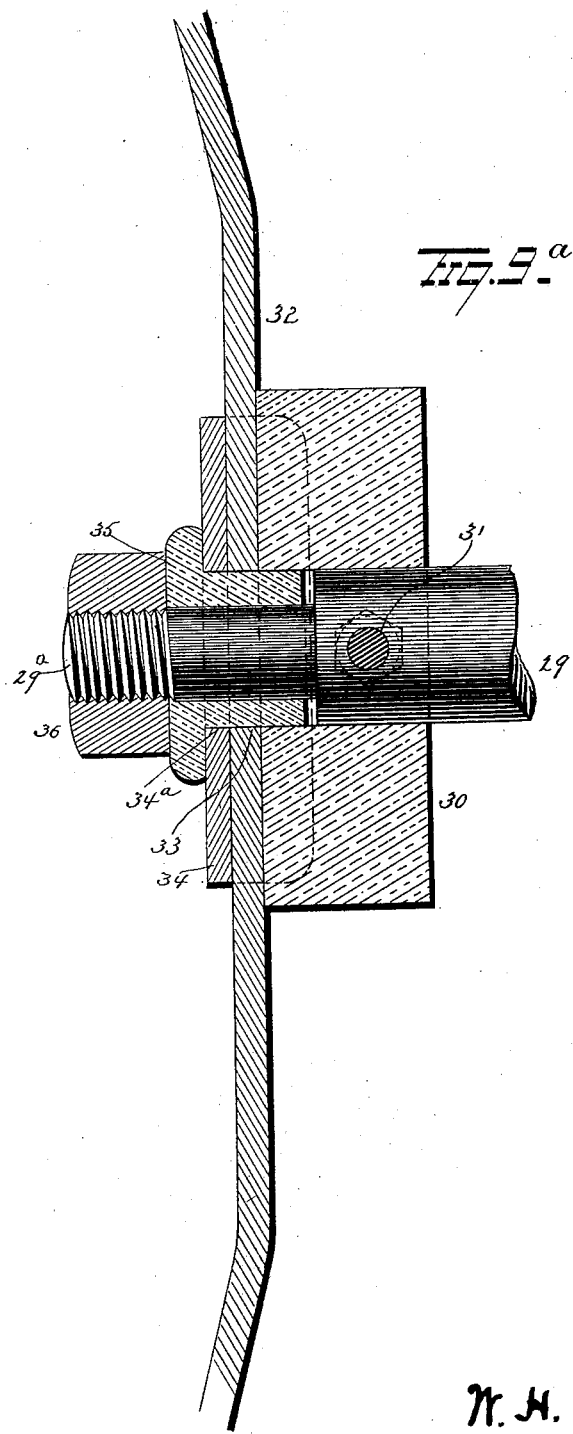

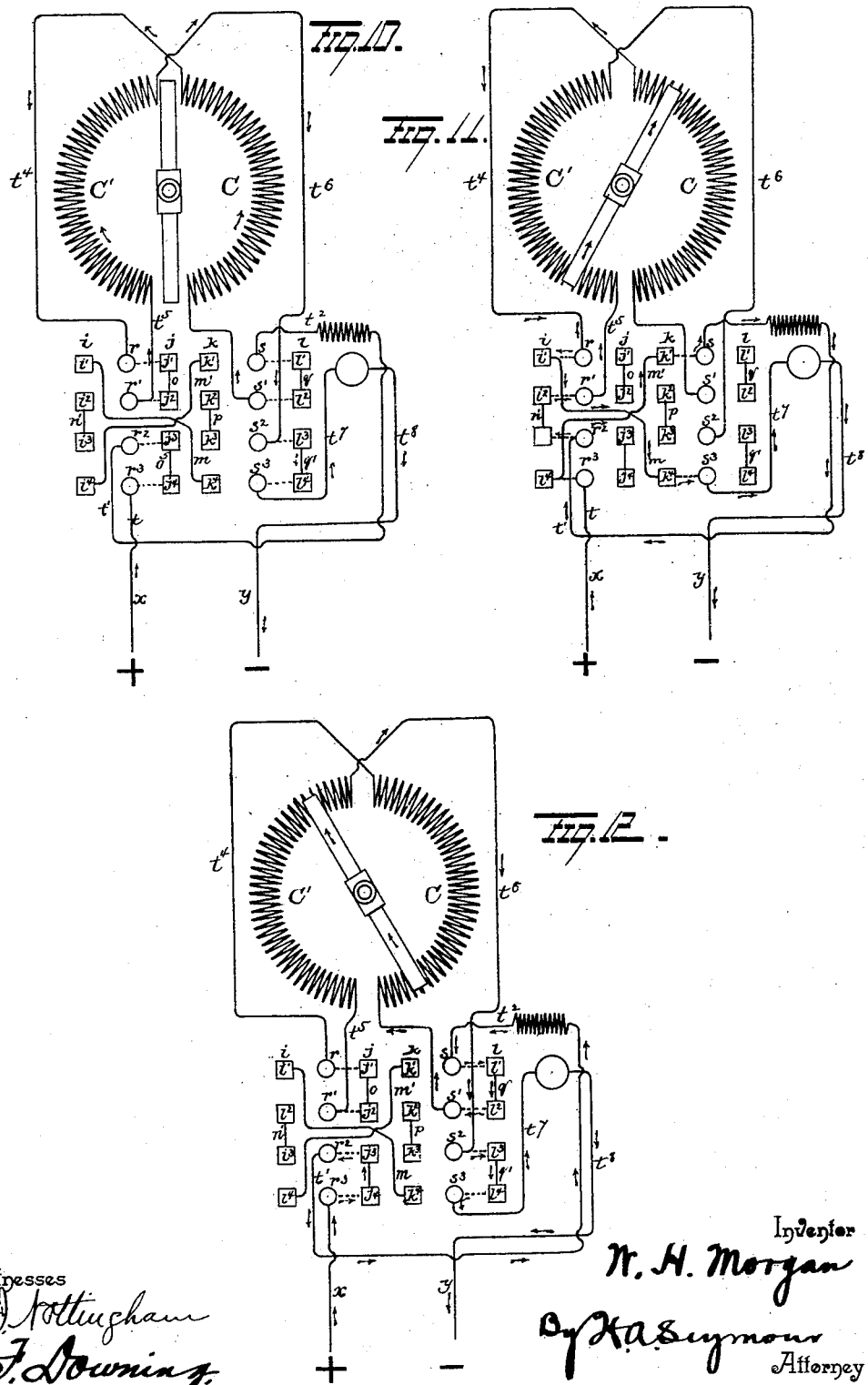

UNITED STATES PATENT OFFICE.

WILLIAM HENRY MORGAN, OF ALLIANCE, OHIO.

ELECTRIC CONTROLLER.

SPECIFICATION forming part of Letters Patent No. 549,608, dated November 12, 1895.

Application filed August 22, 1895. Serial No. 560,169. (No model.)

*To all whom it may concern:*

Be it known that I, WILLIAM HENRY MORGAN, a resident of Alliance, in the county of Stark and State of Ohio, have invented certain new and useful Improvements in Electric Controllers; and I do hereby declare the following to be a full, clear, and exact description of the invention, such as will enable others skilled in the art to which it appertains to make and use the same.

My invention relates to an improvement in controllers for electric motors.

In the operation of large electric motors used for driving heavy machinery, it has been found essential to employ auxiliary appliances for controlling the heavy electric current necessary to operate such motors, so that the full strength of the current will not be suddenly allowed to flow through the coils of the motor and result in their destruction, or at least in impairing the efficiency of the motor by the burning out of the insulations. In order that the electric current shall be caused to enter the coils of the motor with gradually-increasing strength, a variable resistance composed of a number of coils of resistance material has been included in the circuit between the electric generator and the motor and all of the resistance primarily included in the circuit with the motor. Means were then provided for gradually cutting the resistance-coils out of circuit, so as to gradually increase the tension of the current passing through the motor-coils. The speed of the motor has been controlled by including more or less of the resistance in the motor-circuit, so as to increase or decrease the tension of the current through the motor-coils. It has also been proposed to provide a switch for reversing the current through the motor and to actuate such switch by means of the same devices which are employed for controlling the variable resistance or rheostat. The combined apparatus thus produced—viz., a variable resistance or rheostat and a reversing-switch—constitutes an electric controller by means of which the tension of the electric current through the motor and also the direction of the current can be controlled.

Apparatus of this kind as heretofore constructed have been more or less cumbersome, complicated, and inefficient, and their manufacture has involved considerable expense. The provisions for properly ventilating the coils to prevent their excessive heating have been defective, and in many cases the construction and arrangement of the rheostat has not been such as would offer the amount of resistance to very heavy currents, as would render the device efficient from a practical or commercial standpoint.

The object of my invention is to produce a controller for electric motors which shall be simple in construction, by means of which the current can be made to enter the motor under proper and gradually-increasing tension, by means of which adequate resistance can be offered to the initial passage of the current through the motor-coils, and to provide simple and efficient devices whereby the current can be reversed in direction through the motor-coils by the manipulation of the same operating-lever by which the switch-arm of the rheostat is actuated.

A further object is to provide a simple and improved manner of mounting the resistance-coils.

A further object is to provide simple and efficient means for connecting coils of the resistance together in series.

A further object is to provide ample means for the ventilation of the resistance-coils and at the same time afford adequate means for the protection of said coils from injury.

A further object is to improve and simplify the reversing-switch of an electric controller.

A further object is to construct a reversing-switch in such manner as to reduce the liability of injury from sparking and from undue wear between the contacts to a minimum.

A further object is to so construct the spring-actuated contact-arms of a reversing-switch that they can be readily placed in position and so that they can be quickly and easily removed and replaced by others when worn.

A further object is to produce a reversing-switch which shall comprise a small number of parts, which can be manufactured at a comparatively small expense, in which there shall be but little friction between the moving parts, and one which shall be effectual in all respects in the performance of its functions.

A further object is to produce an electric controller which can be manufactured at a comparatively small expense, one which shall be compact in construction, easy to operate, and one which shall be effectual in all respects in the performance of its functions.

With these objects in view the invention consists in a variable resistance comprising a series of frames or wedges and coils of resistance material supported thereby, said frames or wedges being so constructed and arranged as to constitute spacing devices between the coils.

The invention also consists in the combination, with a frame, of a series of frames or wedges, or coils of resistance material mounted on projections on said frames or wedges, and an electrical connector between the free end of one coil and the adjacent frame or wedge.

The invention also consists in a switch immersed in liquid.

The invention also consists in the combination, with a box or chamber containing liquid, of a reversing-switch located within said box or chamber and immersed in said liquid; and the invention also consists in certain novel features of construction and combinations and arrangements of parts, as hereinafter set forth, and pointed out in the claims.

Figure 2:
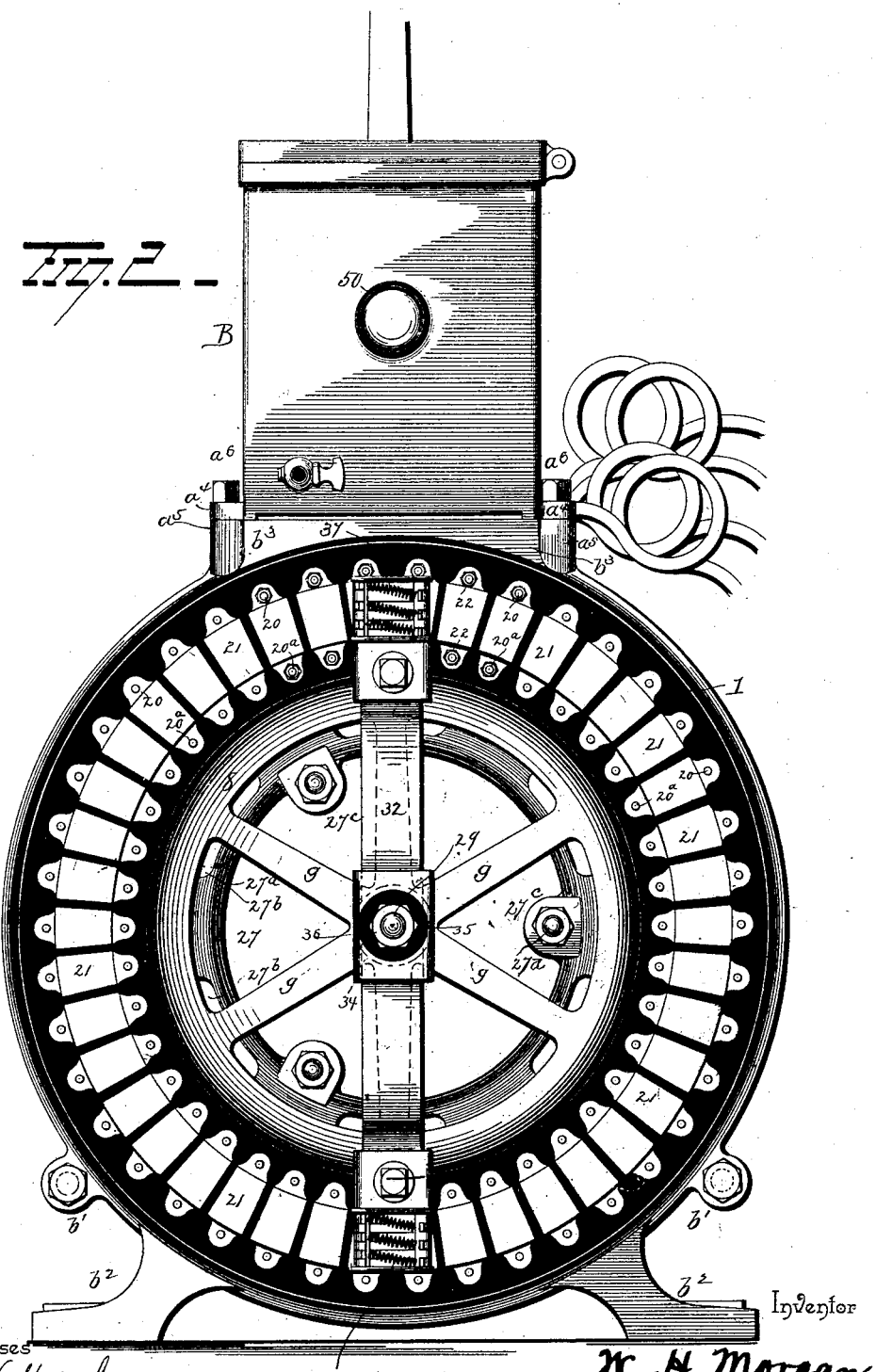
Figure 3:
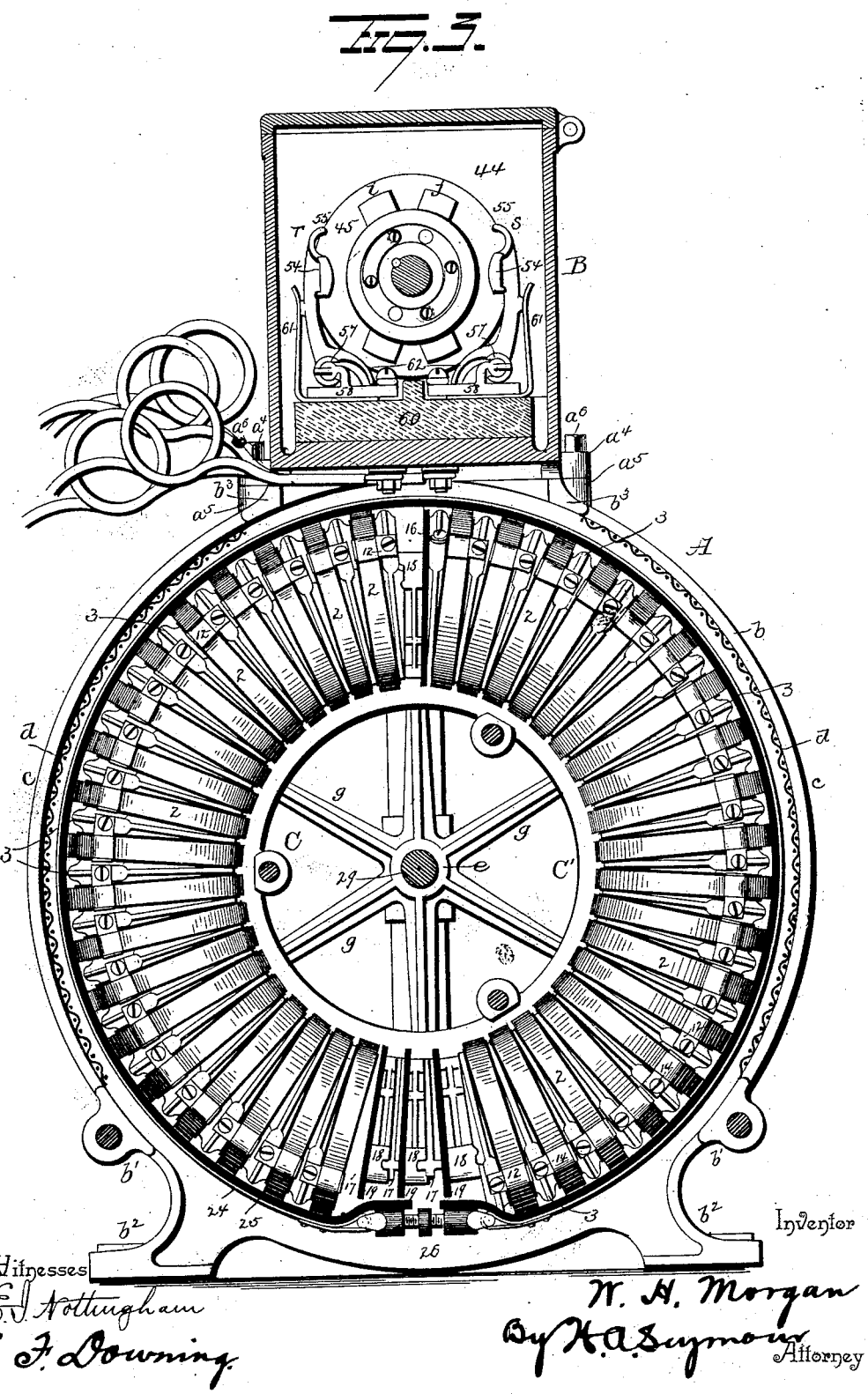
Figure 4:
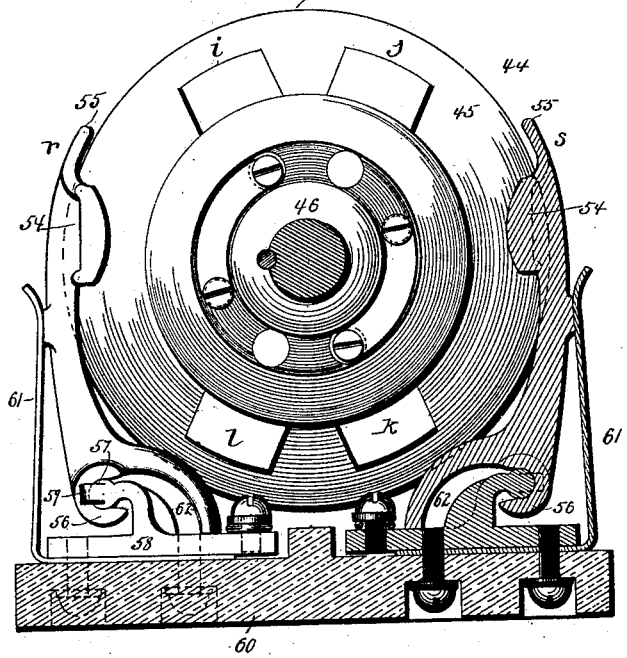
Figure 5:
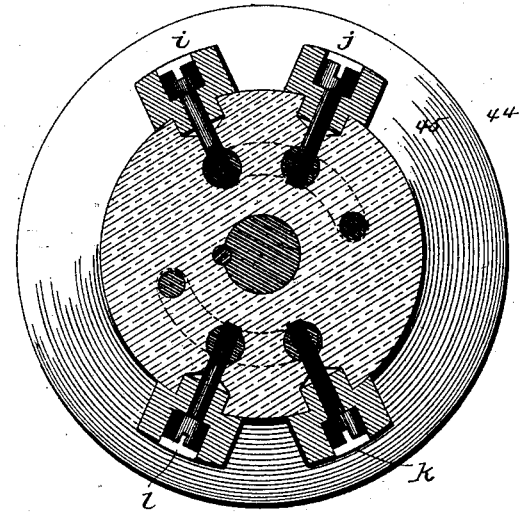

In the accompanying drawings, Figure 1 is an elevation of my improved controller. Fig. 2 is a similar view taken from the opposite side of the apparatus. Fig. 3 is a face view with the casing partly removed and partly in section. Figs. 4, 5, 6, and 7 are detail views of parts of the reversing-switch. Figs. 8, 9, $9^a$, and $9^b$ are detail views of parts of the rheostat. Figs. 10, 11, and 12 are diagrammatical views.

A represents the main frame of the apparatus, and preferably comprises two parts $a\ b$, made at their lower ends with abutting enlargements $a'\ b'$, and from said enlargements feet $a^2\ b^2$ project and constitute the base of the apparatus. Each foot is preferably perforated for the accommodation of bolts whereby to secure the apparatus to the floor. The parts $a\ b$ of the frame are also provided at their top with abutting enlargements $a^3 b^3$, the tops of which are made straight or flat and serve as a seat for a box or casing B, which contains a reversing-switch, hereinafter explained, said box or casing being provided with perforated ears $a^4$, which align with perforated bosses $a^5$ on the main frame, for the accommodation of bolts $a^6$, by which said box or casing is secured to the top of the main frame.

When the parts of the frame or shell A are assembled, as above explained, the edges of said frame or shell, between the enlargements at the top and bottom thereof, will be open, as at $c$, to admit air for ventilating the coils of resistance material disposed within the frame or shell, as hereinafter explained. The openings $c$ in the edges of the frame or shell will preferably be covered by means of large-mesh wire-netting $d$, whereby to protect the coils within said frame or shell. The part $a$ of the frame or shell is also made with open-work, preferably formed by casting the name of the device and the address of the manufacturers as a portion of the frame, the metal between and within the letters being removed, thus forming numerous openings through which air can pass and assist in ventilating the resistance-coils. The central portion of both parts or halves $a\ b$ of the frame or shell are made in form similar to that of a wheel, having hubs $e$, rims or flanges $f$, and spokes or arms $g$, connecting the hubs and rims, said spokes being so arranged as to leave large spaces between them for the admission of air to further assist in the ventilation of the coils.

The part $b$ of the frame or shell A is made, near its outer edge, with a series of slots $h$, and on the outer face of the said part $b$ of the frame or shell a ring 1, preferably of wood or other non-conducting material, is secured and provided with a number of perforations, for a purpose hereinafter explained.

Within the frame or shell A two semicircular sets C C' of resistance-coils 2 are arranged and mounted on supporting frames or wedges 3, and the coils of each set are electrically connected together in series in a manner which will be presently specifically pointed out. The whole series of resistance-coils being arranged in the form of a ring, they will be made to radiate from a common center and the outer edges of the coils will be disposed further apart than the inner edges, thus leaving ventilating-spaces between them. To support the coils thus spaced apart without interfering to any appreciable extent with the proper circulation of air between them, I construct the frames or wedges 3 and mount the coils 2 upon them in a manner which will now be explained.

Each frame or wedge 3 comprises a central hub or sleeve 4, in which an elongated open slot 5 is made, and a series of radiating arms 6 7 8 9, the two latter being connected together by means of a cross-bar 10. The coil 2, which I prefer to make of metallic ribbon, such as German silver, (or iron or other metal might be employed,) is wound (with interposed insulating material) on the hub or sleeve 4, and the inner end of the coil is inserted through the slot 5, so as to electrically connect the coil with the frame or wedge. The arms of the frames or wedges are provided on both sides with lateral ribs, the ribs $7^a\ 8^a$ on the arms 7 8, which bear against the outer portions of the coils, being made wider than the ribs $6^a\ 9^a$, which bear against the inner portions of the coils, the outer portions being spaced farther apart than the inner portions, which is, of course, necessary, as the coils are arranged in the form of a circle. It will be seen that the ribs at one side of the arms of a plate or wedge 3 bear against one face of the coil mounted on the hub of the said plate or wedge, and the ribs on the other sides of said arms bear against one face of an adjacent coil and constitute in effect a wedge between the coils. Suitable insulating material 11 will be interposed between the ribs on the arms of the plates or wedges and the faces of the coils.

At a point in proximity to the free end of each coil a plate or strip 12 of suitable metal is bent around the ribbon of the coil and extended laterally therefrom, the free extremity of the coil being bent over said plate or strip. A hole 13 is made near the free end of the plate or strip 12 for the accommodation of a screw 14, by which it is electrically connected with the arm 7 of the adjacent frame or wedge, the plates or strips 12 thus connecting electrical connectors between the coils 2 and plates or wedges 3, so that the current entering a plate or wedge 3 will flow from the hub or sleeve 4 thereof to the inner end of the resistance-coil, then through the coil, from the free end of which it will flow through the plate or connector 12 to the arm 7 of the next plate or wedge, through which it will pass to the hub thereof and then through the coil mounted on said hub, and so on throughout the set of coils thus connected together in series.

As before stated, the resistance-coils are arranged in two semicircular sets. The upper ends of the two sets of coils and supporting plates or wedges are separated by a spacing-block 15, mounted on the hub of the first frame or wedge of one set, and a disk or disks of insulating material 16, inserted between said spacing-block and the first frame or wedge of the next set. The lower ends of the two sets of coils and their supporting frames or wedges are spaced apart by means of dummy frames or wedges 17 17 17, spacing-blocks 18 18 18, and insulating-disks 19 19 19.

All the wedges or frames are provided with screw-threaded shanks or stems 20 $20^a$, which are passed through the slots $h$ in the part $b$ of the frame or shell A and through the perforations in the annular wooden plate 1, the free extremities of said shanks or stems being passed through perforations in the ends of contact-plates 21, placed on the outer face of said annular wooden plate 1, and on the free ends of said stems or shanks nuts 22 are placed. Dummy contact-plates are also connected with the shanks of the dummy frames or wedges 17.

From this construction and arrangement of parts it will be observed that the cross-bars 10 of the frames or wedges 3 are disposed parallel with the inner face of the part $b$ of the main frame or shell, and between said cross-bars 10 and the inner face of the frame insulating material 23 is inserted. Now it will be seen that when the contact-plates 21 are placed on the stems or shanks of the plates or wedges and the nuts 22 screwed up, said plates or wedges will in effect be clamped to the main frame or shell. The variable resistance is not, however, supported solely in this manner.

The annular series of coils 2 are bound by a steel band 24, between which and the coils stout insulating material 25 is inserted. The ends of the steel band are connected together by means of a turnbuckle 26. The annular series or "ring" of coils are supported on the inside by means of an annular frame 27. This frame is composed of two rings $27^a$, each of which is made with elongated slots $27^b$ to permit the passage of air to the coils 2, and the two rings are made on their inner edges with perforated bosses $27^c$, through which bolts $27^d$ are passed for securing the two rings together to form the frame 27. Rings 28 of insulating material are placed on the annular series of coils 2 at opposite sides thereof, and on these insulating-rings the outer edges of the rings composing the annular frame 27 bear, the inner portions of said frame being disposed a short distance from the coils, so as not to interfere with the free circulation of air between the coils. When the parts of the apparatus are assembled, the peripheries of the rings $27^a$ composing the annular frame 27 will be disposed between the insulating-rings 28 and the rims $f$ of the wheel-shaped centers of the parts of the main frame or shell A, and the said annular frame 27 will be thus held in place.

The hubs $e$ in the center of the parts $a\ b$ of the frame or shell A serve as bearings for a transverse shaft 29, one end of which is preferably contracted in size and screw-threaded, as at $29^a$. A block 30 of insulating material is secured to the shaft 29, in rear of the screw-threaded portion $29^a$ thereof, by means of a transverse bolt 31, and against the outer face of the insulating-block a double switch-arm 32, preferably made of steel, is placed.

The switch-arm is made in its center with a hole 33, through which the screw-threaded end $29^a$ of the shaft 29 passes; but said hole is considerably larger than the portion $29^a$ of the shaft, so that the latter will not be in electrical contact with the switch-arm. A clamping-plate 34 embraces the center of the switch-arm and the insulating-block, and is made with a hole $34^a$ the same size as the hole 33 in the switch-arm. A flanged washer 35 of insulating material is placed on the clamping-plate 34 and enters the holes 33 $34^a$ and effectually insulates the switch-arm and clamping-plate from the screw-threaded end of the shaft 29. A nut 36 is then placed on the screw-threaded end $29^a$ of the shaft and made to bear against the insulating-washer 35. Thus it will be seen that the switch-arm 32 is securely fixed to one end of the shaft 29 and effectually insulated therefrom.

At the respective ends of the switch-arm 32 contact-brushes 37 are secured and adapted to pass over the contact-plates 21 when the shaft 29 is oscillated and cause the resistance-coils to be successively cut out of or into circuit in a manner which will be more fully explained farther on.

In order to oscillate the shaft 29 and cause the brushes on the switch-arm to pass over the contact-plates 21, a pinion 38 is secured to the end of said shaft and receives motion from a rack-bar 39, disposed between the ends of an operating-lever 40. The lever 40 is pivotally connected at its lower end to a pintle 41, projecting outwardly from the bottom of the part $a$ of the frame or shell A. The operating-lever 40 is guided in its movements by means of a slotted arm 42 at the top of the frame, and the throw of said lever may be limited by means of adjustable stops 43, secured to said slotted arm in proximity to the ends thereof.

Having described the construction and arrangement that part of my improved controller by means of which the resistance in the circuit of an electric motor can be varied and controlled, I will now proceed to describe in detail the construction and arrangement of the devices by means of which the current through the motor can be reversed to reverse the direction of rotation of the armature of the motor, and will then explain the mode of conjoint operation of the two leading parts of the apparatus—viz., the variable resistance or rheostat and the reversing-switch.

My improved reversing-switch comprises, in general, an insulated drum carrying contact-blocks, and contact-arms disposed at the respective sides of the drum and adapted to be engaged by contact-blocks on the drum when the latter is oscillated to cause the current to pass in one direction or the other through one part of the motor.

The drum 44 of the reversing-switch is made of insulating material, preferably wood, and is composed of a series of four sections, between each of which a disk 45 of insulating material is inserted and made of sufficient diameter to project some distance beyond the periphery of the drum, and separate contact-blocks secured to one section of the drum from contact-blocks secured to the adjacent section thereof, and said disks form flanges for the drum, between which contact-arms operate and by which said contact-arms are prevented from lateral displacement. To the drum 44 four series $i\ j\ k\ l$ of contact-blocks are secured, and in order to electrically connect certain of the contact-blocks the drum 44 is made with longitudinal perforations for the reception of a series of electrical connectors. The block $i'$ of the series $i$ is electrically connected with the block $k^4$ of the series $k$ by means of a connector $m$. The block $i^4$ of the series $i$ is electrically connected with the block $k'$ of series $k$ by means of a connection $m'$. The blocks $i^2\ i^3$ are connected by a connector $n$. The blocks $j'\ j^2$ and $j^3\ j^4$ are connected, respectively, by connectors $o\ o'$. The blocks $k^2\ k^3$ of series $k$ are electrically united by a connector $p$, and the blocks $l'\ l^2$ and $l^3\ l^4$ are electrically connected, respectively, by connectors $q\ q'$.

The drum 44 is keyed to a shaft 46 and the parts of the drum are clamped together on said shaft by means of disks 47, held in place by means of collars 48 49, screwed on said shaft. One end of the shaft 46 or the collar 48 thereon is mounted in an enlargement 50 on one side of the box or casing B. The other end of the shaft, or, more properly speaking, the collar 49 thereon, is mounted in a suitable bearing on a disk 51, which closes an opening 52 in the opposite side of the box or casing, between which and the disk packing material 53 is inserted. The purpose of the opening 52 is to permit the ready insertion of the drum into the box or casing.

The contact-arms of the reversing-switch are arranged in two groups $r\ r'\ r^2\ r^3$ and $s\ s'\ s^2\ s^3$, one group on each side of the drum. Each contact-arm is made at its upper end with a head 54, having a curved face to be engaged by the contact-blocks on the drum 44, and above the block 54 a knob 55 is provided on each contact-arm.

At the lower end each contact-arm is made with a hook-shaped lip 56, which engages a lug or ear 57 on a plate 58, so as to make a hinged connection therewith, lateral movement of the arm on the lug or ear 57 being prevented by means of small ears 59, projecting from said lug or ear at each side of the lip 56. Each plate 58 is secured to a base 60 of wood or other insulating material placed in the bottom of the box or casing B, and between each plate 58 and the base 60 one end of a flat spring 61 is inserted. The springs 61 are bent up behind the contact-arms and bear against the same, so as to press them against the contact-blocks on the drum when they are engaged by said contact-blocks. The forward movement of the contact-arms will be limited by means of curved fingers 62, which engage the base 60 and prevent the heads on the contact-arms from moving far enough forward when not engaged by the contact-blocks on the drum to engage the face or periphery of the drum.

On one end of the shaft of the drum 44 a bifurcated arm or fork 63, having ears 63ª, is secured and adapted to be engaged by a pin or projection 64 on the operating-lever 40, so that when said lever is moved in one direction or the other the drum will be oscillated (until stopped by the engagement of one of the ears 63ª with a stop 63ᵇ, on box B) and cause either the series of contact-blocks $i\ k$ or the series $j\ l$ to make electrical contact with the two groups of contact-arms, whereby to cause the current to pass in one direction or the other through the field-magnet coils of an electric motor and cause the operation of the latter in one direction or the other, all of which will be more fully explained in the following description of the circuits.

In the diagrammatical views, X Y represent the line-wires. The wire X is connected with the contact-arm $r^3$ by means of a wire $t$. The contact-arm $r^2$ is connected with one end of the field-magnet coil D of an electric motor by means of a wire $t'$. The other end of said field-magnet coil is connected by a wire $t^2$ with the contact-arm $s$. The contact-arm $s'$ is connected with one end of the set C of resistance-coils by a wire $t^3$, and the other end of said set of coils is connected with the contact-arm $r$ by a wire $t^4$. The contact-arm $r$ is connected with one end of the set C′ of resistance-coils by means of a wire $t^5$, and the other end of the set C′ of coils is connected with the contact-arm $s^2$ by a wire $t^6$. The contact-arm $s^3$ is connected by a wire $t^7$ with one of the commutator-brushes of the armature D′ of the motor, and the other commutator-brush is connected with the minus line-wire Y, by a wire $t^8$.

The circuit will be made and broken in the reversing-switch, and in order to prevent the destruction of the contacts on account of sparking when the current is broken and on account of frictional resistance between the contacts, the box or chamber B will be filled with liquid, so as to immerse all the contacts and movable parts of the said reversing-switch.

When the operating-lever shall have been moved sufficiently to close the switch, but not far enough to move the switch-arm of the rheostat off of the dummy contact-plates, the circuit will be closed in one direction through the motor and through the entire resistance, under which conditions the current will flow, as indicated by arrows which can be traced as follows:

The current entering by the plus line-wire X will flow by the wire $t$ to the contact-arm $r^3$, then to contact-block $j^4$, to block $j^3$, to contact-arm $r^2$, by wire $t'$ to one end of the field-magnet coil; from the other end of the field-magnet coil to contact-arm $s$ by wire $t^2$; then to contact-block $l'$, to block $l^2$, to contact-arm $s^2$, to one end of the set C of resistance-coils. From the other end of the set C of resistance-coils, the current will pass to the contact-arm $r$ by the wire $t^4$; then to contact-block $j'$, to block $j^2$, to contact-arm $r'$; then by wire $t^5$, to one end of set C′ of resistance-coils. From the other end of the set C′ of coils, the current will pass, by a wire $t^6$, to contact-arm $s^2$; then to contact-block $l^3$, to block $l^4$, to contact-arm $s^3$; then by wire $t^7$ to armature of motor and from the latter by a wire $t^8$ to the minus line-wire Y.

When the operating-lever is first moved from its normal position, in one direction or the other, the circuit will be closed, including the entire resistance; but as the movement of the lever is continued, so that the brushes on the switch-arm 32 will move off of the dummy contact-plates onto the contact-plates 21 of the resistance-coils 2, the said coils will be gradually cut out of circuit, two at a time, as the movement of the switch-arm continues. By moving the operating-lever back and forth, the number of resistance-coils included in the motor-circuit can be varied to regulate the speed of the motor, as desired.

When the operating-lever of the controller is moved far enough to cut out the resistance-coils, or some of them, the circuit through the reversing-switch will be altered somewhat. When the reversing-switch is thrown in one direction the circuit will be traced, as shown by the arrows, and when the switch is thrown in the other direction the circuit through the switch will be as indicated by the arrows in Fig. 12.

With the position of parts shown in Fig. 11 the circuit will be the same as above described until the set C of resistance-coils is reached. The current will flow through more or less coils 2 of set C, (according to the position of the switch-arm 32,) then through the switch-arm 32 to a coil 2 of the set C′, then through a portion of the coils of said set C′, then by wire $t^6$ to contact-arm $s^2$, to contact-block $l^3$, to block $l^4$, to contact-arm $s^3$, then by wire $t^7$ to the armature of the motor and from the armature to the minus line-wire Y by the wire $t^8$.

When the motor is to be run in the reverse direction, the operating-lever will be moved to throw the reversing-switch to cause a reversal of the direction of the current through the field-magnet coils, and under such conditions the circuit can be traced as follows, and as shown by the arrows in Fig. 12:

The current will enter the controller at the contact-arm $r^3$, as above described; but the drum of the switch having been oscillated, the relations of the contact-blocks to the contact-arms have been changed, and the current will pass from the arm $r^3$ to the contact-block $i^4$, then by the connector $m'$ to block $k'$, then to contact-arm $s$, to field-magnet coil by wire $t^2$, from field-magnet coil by wire $t$ to contact-arm $r^2$, to contact-block $i^3$, to block $i^2$, to contact-arm $r'$, to set C′ of resistance-coils by wire $t^5$, through more or less of said coils to switch-arm 32, through said switch-arm to coils of the set C, through more or less of the set of coils C, then by wire $t^4$ to contact-arm $r$, to block $i'$, to block $k^4$ by connector $m$, to contact-arm $s^3$, then to armature of motor by wire $t^7$, and from the armature to the minus line-wire by the wire $t^8$.

It is evident that instead of reversing the current through the field-magnet coils of the motor, as above described, the connections in the reversing-switch could be so arranged as to cause the current through the armature to be reversed to reverse the motor.

Various slight changes might be made in the details of construction of my invention without departing from the spirit thereof or limiting its scope, and hence I do not wish to limit myself in the precise details of construction herein set forth; but, Having fully described my invention, what I claim as new, and desire to secure by Letters Patent, is—

1. A frame for an electric controller, consisting of two open castings secured together so as to form a shell or casing having elongated openings in its sides or edges, and wire netting in said elongated openings, substantially as set forth.

2. In an electric controller, the combination with a frame or shell, and coils of resistance material arranged therein in annular form, of an annular frame located within the annular series of coils, and insulating rings on said coils, said annular frame being so constructed as to rest at its edges only against said insulating rings and be free from the coils at other points, substantially as set forth.

3. In an electric controller, the combination with a frame or shell and an annular series of resistance coils therein, of an annular frame within said annular series of coils, said frame bearing at its outer edges against insulating material on the coils, and said annular frame having slots for the passage of air to the coils substantially as set forth.

4. In an electric controller, the combination with a frame or shell and an annular series of resistance coils therein, of an annular frame within said annular series of coils and bearing at its edges against insulating material on said coils, said annular frame being composed of two rings having perforated bosses, for the reception of bolts, and each ring having a series of slots to permit the free passage of air to the resistance coils, substantially as set forth.

5. In an electric controller, the combination with a frame or shell, of an annular series of frames or wedges secured to said frame, coils of resistance mounted on said frames or wedges and a band binding said coils together, substantially as set forth.

6. In an electric controller, the combination with a frame or wedge having a hub, of a resistance material mounted on said hub and electrically connected at one end thereto, and a plate or strip constructed and adapted to bind the free end of the coil and serve to electrically connect it with the frame or wedge of an adjacent coil, substantially as set forth.

7. In an electric controller, the combination with a series of resistance coils, of frames or wedges for supporting said coils, each frame or wedge comprising a hub on which the coil is wound and to which it is connected, and a series of radiating arms of varying thicknesses, radiating from said hub, and bearing against the faces of the coils, substantially as set forth.

8. In an electric controller, the combination with a curved series of coils of resistance material, of a series of frames or wedges for supporting said coils and separating them to form ventilating spaces between them, each frame or wedge comprising a slotted hub on which the coil is wound and to which it is electrically connected, a series of arms radiating from said hub, and ribs projecting from said arms in both directions, the ribs on the outer arms being wide and the ribs on the inner arms being narrow, substantially as set forth.

9. In an electric controller, the combination with a frame or shell and an annular series of resistance coils therein, of a series of frames or wedges for supporting said coils, each frame or wedge comprising a hub on which the coil is wound and with which it is connected, a series of arms radiating from said hub and bearing against two adjacent coils, shanks projecting from two of said arms and projecting through one face of the frame or shell, a cross bar connecting said last-mentioned arms and bearing against insulating material on the frame or shell, an insulated ring secured to the frame or shell through which said shanks pass, contact plates connected with said shanks and nuts on the shanks, substantially as set forth.

10. In an electric controller, the combination with a frame or shell, two sets of resistance coils therein, and contact plates connected with said coils, of a shaft mounted in the frame, a block of insulating material secured to one end of said shaft, a double switch arm mounted on said block, brushes carried at the ends of said arm and adapted to make electrical contact with said contact plates, a clamping plate connecting the switch arm with the insulating block, an insulating washer entering perforations in the switch arm and clamping plate and a nut on the end of the shaft and bearing against said washer, substantially as set forth.

11. In an electric controller, the combination with a frame or shell made in two parts secured together, and an annular series of resistance coils in said frame, of an annular frame disposed within said annular series of coils and having its outer edges disposed between the parts of the main frame and the coils, and insulating rings disposed between said coils and the edges of the annular frame, substantially as set forth.

12. In an electric controller having a series of coils constituting a variable resistance, of frames or wedges for supporting said coils and spacing them apart, each frame or wedge comprising a hub or sleeve, a series of radiating arms, a cross bar connecting two of said arms and shanks or stems projecting from two of said arms, substantially as set forth.

13. In an electric controller, the combination with a frame or shell, of two semi-circular sets of resistance coils located therein and having contact plates connected therewith, the coils of each set being connected in series, spacing devices and insulating disks between the two sets of coils, and dummy contact plates between the two sets of coils at one end thereof, substantially as set forth.

14. In an electric controller the combination with a frame or shell, of an annular series of frames or wedges secured within said frame, contact plates connected with said frames or wedges, and two semi-circular sets of resistance coils mounted on said frames or wedges, the coils of each set being connected together in series and the two sets insulated from each other, several of said frames or wedges at one point being dummies, and a double switch arm having brushes to make contact with said contact plates, substantially as set forth.

15. In an electric controller, the combination with a frame or shell, a series of frames or wedges therein and a series of resistance coils mounted on said frames or wedges and electrically connected at one end therewith, of a metallic strip bent around the free end of each coil and extended laterally therefrom, and a fastening device for securing the free end of each metallic strip with the adjacent frame or wedge whereby said coils will be connected together in series, substantially as set forth.

16. In a reversing switch, the combination with a box or casing, of contact arms, an oscillatory drum of insulating material and having a series of longitudinal perforations, contact blocks on the drum to engage the contact arms when the drum is oscillated, and electrical connectors inserted in the longitudinal perforations in the drum, for connecting said contact blocks together in pairs, substantially as and for the purpose set forth.

17. In a reversing switch, the combination with contact arms, of an oscillatory drum of insulating material, a series of disks constituting annular flanges projecting from said drum and between which said contact arms are disposed, and contact blocks on said drum electrically connected together in pairs and adapted to engage said contact arms substantially as and for the purpose set forth.

18. In a reversing switch, the combination with contact arms, of an oscillatory drum composed of a series of sections of insulating material and disks of insulating material interposed between said sections, contact blocks secured to the drum and adapted to engage said contact arms and electrical connectors connecting said contact block together in pairs, substantially as set forth.

19. In a reversing switch, the combination with two groups of contact arms, of a drum disposed between said groups, contact blocks on said drum adapted to engage the contact arms, said contact blocks being electrically connected together in pairs, a forked arm connected with the shaft of said drum, a lever for actuating said forked arm to oscillate the drum, lugs on said forked arm and a stop on the casing of the switch to be engaged by said lugs whereby to limit the oscillatory movement of the drum, substantially as set forth.

20. In a switch, the combination with a box or casing and a base of insulating material therein, of an oscillatory drum, contact blocks on said drum, metallic plates secured to said base and having lugs thereon, contact arms having hooks or lips to engage said lugs, heads at the free ends of said arms and springs behind said arms whereby to insure the engagement of the contact blocks on the drum with the heads on the contact arms, substantially as set forth.

21. In a switch, the combination with a drum carrying contact blocks, of an insulated base plate secured thereto and having lugs contact arms hinged to said lugs, ears at the respective ends of said lugs to prevent lateral displacement of the contact arms and springs behind said contact arms, substantially as set forth.

In testimony whereof I have signed this specification in the presence of two subscribing witnesseses.

WILLIAM HENRY MORGAN.

Witnesses:
 F. E. DUSSEL,
 E. WOOLGAR.